United States Patent
Mai

(12) 
(10) Patent No.: US 6,382,954 B1
(45) Date of Patent: May 7, 2002

(54) DEVICE FOR TEMPERATURE ADJUSTMENT OF AN OBJECT

(75) Inventor: Arnold Mai, Irrel (DE)

(73) Assignee: Husky Injection Molding Systems, Ltd., Ontario (CA)

( * ) Notice: Subject to any disclaimer, the term of this patent is extended or adjusted under 35 U.S.C. 154(b) by 0 days.

(21) Appl. No.: 09/742,499

(22) Filed: Dec. 20, 2000

(51) Int. Cl.⁷ .............................................. B29C 49/64
(52) U.S. Cl. ...................... 425/445; 425/526; 425/547
(58) Field of Search .............................. 425/526, 547, 425/445; 264/237, 338

(56) References Cited

U.S. PATENT DOCUMENTS 4,102,626 A * 7/1978 Scharrenbroich ........... 425/526
4,729,732 A * 3/1988 Schad et al. ................. 264/348
5,942,259 A * 8/1999 Uchiyama et al. ........... 425/526
6,190,157 B1 * 2/2001 Hofstetter et al. .......... 425/526

* cited by examiner

*Primary Examiner*—Robert Davis
(74) *Attorney, Agent, or Firm*—Katten Muchin Zavis

(57) ABSTRACT

A device for temperature adjustment of an object comprises a conditioning tube with at least one temperature conditioning means, said conditioning tube having an open front end for receiving said object at least partially, wherein a conditioning sleeve is slideably arranged inside said conditioning tube, said conditioning tube having an open front end for receiving said object at least partially and an inner cooling surface for leaning against an outer surface of said object, said conditioning sleeve being biased towards the front end of said conditioning tube by an elastic means.

8 Claims, 1 Drawing Sheet

DEVICE FOR TEMPERATURE ADJUSTMENT OF AN OBJECT

BACKGROUND OF THE INVENTION

1. Field of the Invention

The present invention relates to a device for temperature adjustment of an object, especially a device and a method for temperature adjustment of a molded object after removal from a mold cavity of an injection molding machine.

2. Summary of the Prior Art

In order to improve the productivity of injection molding equipment, it has been known to reduce the cycle time for molding an object by removing the molded object from the mold cavity while it is still at high temperature. The molded object has thus to be cooled in a subsequent step in order to reduce the temperature of the molded object below its crystallization temperature range.

Turret style injection machines comprise a rotatable turret block with a plurality of movable mold halves and a stationary mold half and platen. Each of the movable mold halves includes a set of mold cores adapted for engagement with a set of mold cavities located in stationary mold half and platen. After a set of objects has been formed on the mold cores of the first movable mold halve, the turret block rotates to a second position, in which the second movable mold halve is positioned for engagement with the stationary mold half. The set of objects remains on the mold cores of the first movable mold and is cooled by a cooling fluid, which is blown onto the exterior surface of the object. U.S. Pat. No. 4,449,913 discloses such a rotary injection turret for use in making preforms. The patent teaches a turret block rotatable on a vertical axis, which block uses two of the turret block positions for post mold treatment of preforms while the preforms are still on mold cores. Accordingly, after injection, hold and some cooling at a first station, the turret block rotates to a second position where cooling fluid is blown onto the exterior surface of the preforms in order to cool the preforms. At a third position, the preforms are inserted into a conditioning mold from the turret block where further temperature conditioning is performed by blowing a cooling gas onto the exterior surface.

While the cooling with a cooling gas permits to condition the object without making contact with its surface, it does however not provide the best available heat exchange. In fact, the best possible heat exchange is provided by conduction cooling, i.e. by a heat transfer contact between the exterior surface of the object and a cooled surface.

Hence it has been found to provide cooling tubes comprising at least one cooling channel through which a cooling fluid is passed. The cooling tube has an inner shape corresponding substantially to the outer shape of the object, so that when the object is inserted into the cooling tube, a large surface contact is established between the cooled inner surface of the cooling tube and the outer surface of the object. While this type of conditioning device is very efficient, the establishment of a contact between the surface of the object and the cooling tube always bears the risk of damaging the outer surface of the object. This risk is especially high if the exterior surface of a freshly molded object is still at high temperature and therefore very fragile.

It follows that a device of this type requires a very exact alignment with the object as it is moved to enclose the exterior surface of the object while the object is on the mold core. While the exact robotic alignment is already rather difficult for a single cooling tube, the task gets impossible if a plurality of cooling tubes, typically up to 96, have to be simultaneously aligned with an equal number of objects on the respective molding cores. The slight misalignments in the positioning of such multiple tube devices can cause the tubes to scratch the exterior surface of the object as the multiple tubes are moved over the multiple cores.

In order to reduce the risk of damaging the freshly molded object, U.S. Pat. No. 4,102,626 teaches to mount a cooling tube yieldably onto a base member, so as to enable the cooling tube to yield by moving substantially axially in response to introduction of an object. To this effect, a rearward end of the cooling tube is received in a guiding opening of the base member and biased towards the object by means of helical springs. This guiding of the cooling tube by its rearward end constitutes a major disadvantage of the cooling tube of U.S. Pat. No. 4,102,626. In fact the cooling tube is susceptible to tilting, thereby blocking the axial movement of the cooling tube. Furthermore the tilting of the cooling tube increases the misalignment with respect to the object to be introduced. A further disadvantage of this device is that due to the movability of the cooling tube, the connection of the cooling channel of the cooling tube to a cooling fluid supply is more expensive than the connection of a stationary cooling tube.

SUMMARY OF THE INVENTION

The object of the present invention is to provide an improved device for cooling a molded object, which reduces the risk of damaging the object.

This object is achieved by a device for temperature adjustment of an object, comprising a conditioning tube with at least one temperature conditioning means, said conditioning tube having a rear end for fixedly mounting said conditioning tube on a base member and an open front end for receiving said object at least partially, wherein a conditioning sleeve is slideably arranged inside said conditioning tube, said conditioning tube having an open front end for receiving said object at least partially and an inner cooling surface for leaning against an outer surface of said object, said conditioning sleeve being biased towards the front end of said conditioning tube by an elastic means.

Unless the device of U.S. Pat. No. 4,102,626, the cooling tube of the present invention will be fixedly mounted on a base member. Hence, the cooling tube can not tilt and accordingly, no further misalignment between the object and the cooling tube can occur. In addition, the stationary cooling tube can easily be supplied with conditioning fluid through the base member. In the case of a slight misalignment between the conditioning tube of the present invention and an object, the surface of the object will come into contact with the conditioning sleeve. This conditioning sleeve can then slide into the conditioning tube against the action of the elastic means. It follows that the force acting on the surface of the object is reduced to the reaction force of the elastic means, which will be considerably smaller than the positioning forces of the conditioning tube. By using a suitably elastic means, i.e. an elastic means having a small spring rate, the forces acting on the surface of the object can in fact be easily reduced below a critical value so that no damage of the surface occurs.

It has to be noted that the spring rate of the elastic means needs to be sufficiently high in order to enable the elastic means the overcome the friction between the conditioning tube and the conditioning sleeve. By choosing an elastic means having a spring rate close to the minimum value, the force acting on the surface of an object in case of misalignment tends towards zero.

The conditioning sleeve can have an inner shape which substantially matches an outer shape of said object. It follows that the conditioning surface of the conditioning sleeve will exactly match the outer surface of the object when said object is inserted into the sleeve. It follows that a large surface contact is established immediately upon insertion of the object. If the device for conditioning an object is used for cooling a molded plastic part which is normally tapered in order to facilitate removal from the injection mold, the conditioning sleeve will have a matching internal taper. Accordingly the conditioning sleeve will be urged into contact with the external surface of the molded part by the elastic means, such that there is an "intimate fit" between the matching surfaces, which allows rapid transfer of heat from the plastic part to the sleeve. As the plastic part cools its external diameter will shrink slightly and the biasing of the sleeve urges it to slide further over the part to maintain the intimate contact as the part's diameter reduces.

In order to enable the cooling sleeve to slide on the object, the conditioning surface of said conditioning sleeve is preferably highly polished. Such an highly polished surface furthermore improves the intimate contact between both parts and reduces the risk of damaging the outer surface as the sleeve slides on the object.

In order to achieve an high heat transfer between the object and the conditioning tube, it should be clear that the conditioning sleeve as well as the conditioning tube are preferably formed of an highly heat conducting material, e.g. metal or the like.

In a preferred embodiment of the conditioning sleeve, an inner edge of the front end of the conditioning sleeve is beveled. It should be clear that the chamfered edge makes the insertion of the object into the sleeve easier. Furthermore the absence of sharp edges further reduces the risk of scratching the surface of the object.

The elastic means preferably comprises a spring which is arranged between inwardly extending stop means of said conditioning tube and the conditioning sleeve. The stop means can e.g. comprise an annular ring arranged at a rear end of the conditioning tube.

In order to confine the conditioning sleeve inside the conditioning tube, further inwardly extending stop means for said conditioning sleeve are preferably arranged near the front end of said cooling tube.

The temperature conditioning means can comprise a conditioning fluid channel arranged in said conditioning tube, said conditioning fluid channel being connectable to a conditioning fluid supply. It has to be noted that the conditioning fluid can be either a cooling fluid, as e.g. chilled water, for cooling a warm object or a heat carrier for heating the object.

DETAILED DESCRIPTION OF THE PREFERRED EMBODIMENTS

Figure 1:
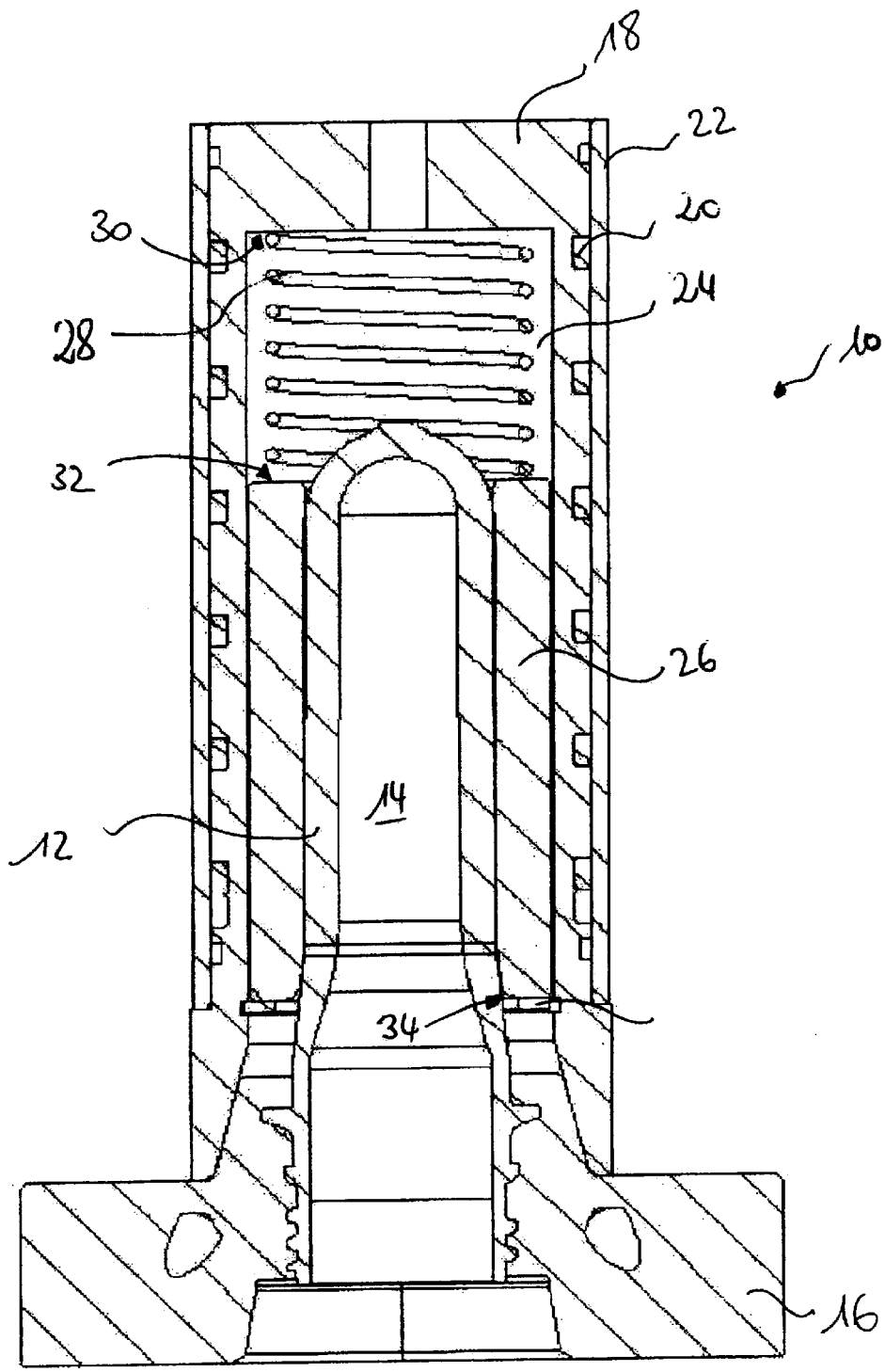
FIG. 1 is a partial sectional view of a preferred embodiment of the present invention.

The present invention will be more apparent from the following description of a not limiting embodiment with reference to the attached FIG. 1.

FIG. 1 shows an embodiment of a device 10 for cooling an object, which is specifically adapted for cooling a molded object on a mold core. In an application on a turret style molding machine, a plurality of these devices are arranged in a conditioning mold, the number of the devices being equal to the number of the cores of the mold half and the positioning being in accordance with the arrangement of the cores.

The object shown in FIG. 1 is a preform 12 for blow molding a plastic bottle. During the molding process, the preform 12 is molded on one of the mold cores 14 of a first mold half 16, which is introduced in a mold cavity of a second mold half (not shown). After some cooling in the water-cooled second mold half, the first mold half is removed from the second mold half and rotated in a conditioning position of the turret. In this conditioning position, further cooling has to be performed in order to reduce the temperature of the preform to a value below its crystallization temperature.

The preform is therefore introduced in a cooling device 10 comprising a cooling tube 18 formed of heat conducting material, e.g. metal, and having at least one cooling channel 20 arranged therein. The cooling channel 20 may e.g. be machined in the outer surface of the cooling tube 18 and closed by an outer jacket or sleeve 22. In operation, the cooling channel 20 is connected to a cooling fluid supply (not shown) for flowing a cooling fluid through the channel 20.

Cooling tube 18 has an inner opening 24 which is considerably larger than the diameter of the preform 12. Inside the cooling tube 18 a cooling sleeve 26 formed of an heat conducting material is slideably arranged. The cooling sleeve 26 has an outer shape which matches the inner shape of the cooling tube 18. It follows that a heat conducting contact is established between the cooling sleeve 26 and the cooling tube 18, which enables heat to transfer from the cooling sleeve 26 towards the cooling fluid flowing through the cooling channel 20 of the tube 18.

The inner shape of the cooling sleeve 26 matches the outer form of the preform 12. The preform is normally tapered in order to facilitate removal from the injection mold, accordingly the cooling sleeve will have a matching internal taper.

A spring 28 is further arranged inside the cooling tube 18 for biasing the cooling sleeve 26 in the direction of the preform 12. The spring 28 is preferably arranged between rear stop means, e.g. the bottom 30 of the closed tube 18, and a rear face 32 of the cooling sleeve. The spring 28 urges the cooling sleeve 26 towards the preform 18, so that after insertion of the preform into the cooling sleeve 26, an intimate contact is established between the two parts which allows rapid transfer of heat from the plastic part to the sleeve.

In the case of a slight misalignment between the cooling tube 18 and the preform 26, the preform will slide the cooling sleeve 26 into the cooling tube against the action of the spring 28. If the spring is suitably dimensioned, the forces acing on the preform will be sufficiently small so as not to damage the surface of the object. Furthermore, the sleeve comprises preferably a beveled or rounded inner edge 34, so that scratching of the surface can be prevented.

It has to be noted, that inwardly extending stop means, e.g. an annular ring 34, are preferably arranged near the front end of the cooling tube 18 for confining the cooling sleeve inside the cooling tube.

Furthermore, an evacuation channel 36 is preferably arranged in the rear part of the cooling tube for evacuating air comprised in the opening 24 when said preform is inserted into the tube 18.

What is claimed is:

1. Device for temperature adjustment of an object, comprising a conditioning tube with at least one temperature conditioning means, said conditioning tube having a rear end for fixedly mounting said conditioning tube on a base member and an open front end for receiving said object at least partially, wherein a conditioning sleeve is slideably arranged inside said conditioning tube, said conditioning tube having an open front end for receiving said object at least partially and an inner cooling surface for leaning against an outer surface of said object, said conditioning sleeve being biased towards the front end of said conditioning tube by an elastic means.

2. Device according to claim 1, wherein said conditioning sleeve has an inner shape which substantially matches an outer shape of said object.

3. Device according to claim 1, wherein said conditioning sleeve is formed of a highly heat conducting material.

4. Device according to claim 1, wherein the conditioning surface of said conditioning sleeve is highly polished.

5. Device according to claim 1, wherein at least an inner edge of the front end of the conditioning sleeve is beveled.

6. Device according to claim 1, wherein said conditioning tube comprises inwardly extending stop means and wherein said elastic means comprises a spring which is arranged between said stop means and said conditioning sleeve.

7. Device according to claim 1, comprising inwardly extending stop means for said conditioning sleeve, said stop means being arranged near the front end of said cooling tube.

8. Device according to claim 1, wherein said temperature conditioning means comprises a conditioning fluid channel arranged in said conditioning tube, conditioning fluid channel being connectable to a conditioning fluid supply.

* * * * *